United States Patent
Jain et al.

(10) Patent No.: US 11,005,729 B2
(45) Date of Patent: May 11, 2021

(54) SATISFYING SERVICE LEVEL AGREEMENT METRICS FOR UNKNOWN APPLICATIONS

(71) Applicant: Juniper Networks, Inc., Sunnyvale, CA (US)

(72) Inventors: Bhaskar Jain, Bangalore (IN); Rajneesh Kumar, Bangalore (IN); Ravi Kumar G V Subrahmanya, Hyderabad (IN); Sai Sundar Ramamurthy, Bangalore (IN); Unni Dilip, Bangalore (IN); Vijay Sai Ram Paruchuri, Bangalore (IN); Sanjay Kumar Gupta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/354,027

(22) Filed: Mar. 14, 2019

(65) Prior Publication Data
US 2020/0296011 A1    Sep. 17, 2020

(51) Int. Cl.
*H04L 12/24*    (2006.01)
*H04L 12/26*    (2006.01)

(52) U.S. Cl.
CPC .......... *H04L 41/5006* (2013.01); *H04L 43/10* (2013.01)

(58) Field of Classification Search
None
See application file for complete search history.

(56) References Cited

U.S. PATENT DOCUMENTS

| 6,651,099 B1 * | 11/2003 | Dietz | H04L 29/06 709/224 |
| 6,771,646 B1 * | 8/2004 | Sarkissian | G06F 12/123 370/252 |
| 6,801,940 B1 | 10/2004 | Moran et al. | |

(Continued)

FOREIGN PATENT DOCUMENTS

WO    2013184846 A1    12/2013

OTHER PUBLICATIONS

Extended Search Report dated Nov. 7, 2019 in counterpart EP application No. 19182052.1, 9 pp.

(Continued)

*Primary Examiner* — Scott B Christensen
(74) *Attorney, Agent, or Firm* — Shumaker & Sieffert, P.A.

(57) ABSTRACT

In general, the disclosure describes techniques for assigning traffic originating from an unknown application to a link based on known application quality of experience metrics. For instance, a network device may receive an application data packet of a data flow for an application and determine an application signature of the application data packet. The network device may determine whether the application signature matches an entry in an application signature database, and if the application signature does not match, the network device may identify a class of the application based on one or more characteristics of the application data packet. The network device may then assign the application data packet of the data flow to a first link of a plurality of links based on the class of the application and quality of experience (QoE) metrics for each link.

20 Claims, 5 Drawing Sheets

(56) References Cited

U.S. PATENT DOCUMENTS

| | | | |
|---|---|---|---|
| 7,457,870 B1* | 11/2008 | Lownsbrough | H04L 41/5058 709/217 |
| 7,509,414 B2 | 3/2009 | Agarwal et al. | |
| 7,664,048 B1* | 2/2010 | Yung | H04L 41/28 370/235 |
| 7,944,822 B1 | 5/2011 | Nucci et al. | |
| 7,962,582 B2 | 6/2011 | Potti et al. | |
| 8,396,807 B1 | 3/2013 | Yemini et al. | |
| 2003/0229708 A1 | 12/2003 | Lie et al. | |
| 2007/0076606 A1* | 4/2007 | Olesinski | H04L 41/142 370/230 |
| 2008/0155087 A1 | 6/2008 | Blouin et al. | |
| 2009/0285201 A1* | 11/2009 | Ben-Haim | H04L 67/322 370/352 |
| 2011/0276951 A1 | 11/2011 | Jain | |
| 2012/0155398 A1* | 6/2012 | Oyman | H04W 28/24 370/329 |
| 2012/0278441 A1* | 11/2012 | Li | H04N 21/8455 709/219 |
| 2012/0330711 A1 | 12/2012 | Jain et al. | |
| 2014/0064080 A1* | 3/2014 | Stevens | H04L 47/2483 370/235 |
| 2015/0156082 A1 | 6/2015 | Kakadia et al. | |
| 2015/0188767 A1* | 7/2015 | Li | H04L 41/12 370/254 |
| 2015/0195745 A1* | 7/2015 | Farmanbar | H04W 28/12 370/236 |
| 2016/0112896 A1* | 4/2016 | Karampatsis | H04W 28/0289 370/230.1 |
| 2017/0126564 A1* | 5/2017 | Mayya | H04L 63/0281 |
| 2018/0191588 A1 | 7/2018 | Kuemmel et al. | |
| 2019/0052553 A1 | 2/2019 | Subramanian et al. | |
| 2019/0386918 A1 | 12/2019 | Iyer et al. | |

OTHER PUBLICATIONS

Boutaba et al., "A comprehensive survey on machine learning for networking: evolution, applications and research opportunities," Journal of Internet Services and Applications, Sep. 2018, 99 pp.

Kooij et al., "SLA Calculus for End-To-End QOS of TCP-Based Applications in a Multi-Domain Environment," Delft University of Technology, the Netherlands, Mar. 2006, 8 pp.

Siekkinen, "Root Cause Analysis of TCP Throughput: Methodology, Techniques, and Applications," Universite De Nice-Sophia Antipolis—UFR Sciences, Oct. 2006, 223 pp.

Response to the Extended Search Report dated Nov. 7, 2019 in counterpart EP application No. 19182052.1, filed Mar. 11, 2021, 22 pp.

* cited by examiner

SATISFYING SERVICE LEVEL AGREEMENT METRICS FOR UNKNOWN APPLICATIONS

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

SUMMARY

In general, the disclosure describes techniques for evaluating traffic flows for a particular application and assigning the traffic originating from an unknown application to a link based on known application quality of experience metrics (QoE). The Software-Defined Wide Area Networks (SD-WAN) appliance that implements the techniques described herein may evaluate the traffic upon arrival, and if the traffic is associated with an unknown application, the SD-WAN appliance determines a class of the application (e.g., video, audio, etc.) based on various characteristics of the data packets in the traffic flows, such as a packet size, a header flag, an inter-arrival time between the application data packet and a subsequent application data packet in the data flow, a traffic pattern, or the payload of the data packet itself.

In some SD-WANs, the SD-WAN routing appliance may specify a path for data flows between client devices and application servers. These paths are typically selected using service-level agreement (SLA) parameters and various QoE metrics of the WAN links. While the SLA parameters may be more static in nature, or at least predetermined prior to the SD-WAN appliance receiving the flow, the metrics of the various WAN links may be more dynamic, as the metrics describing the capabilities of the particular WAN link may vary based on various current aspects of the network. These metrics are obtained by sending probe packets on the various links and analyzing the results of the transmission, where probe packets having the same size as the data packets in the data flow reasonably measure how the particular WAN link could handle the data flow.

SLA parameters may be application specific, and known applications may have their respective SLA parameters stored on the SD-WAN appliance. The SD-WAN appliance may be charged with ensuring that it forwards traffic for the particular application on a link that has QoE metrics that satisfy the SLA parameters. In many instances, an application is "known" to the SD-WAN appliance, meaning that characteristics regarding the application, having been previously defined by the SD-WAN appliance, the client device, or the application developer themselves, are stored in a database by and/or available to the SD-WAN appliance. These known applications may have SLA parameters that are defined by the client device and/or application developers that should be satisfied whenever application traffic for that known application is received by the SD-WAN appliance. However, unknown applications, or applications that do not have previously-defined SLA parameters or characteristics stored in a database by and/or available to the SD-WAN appliance, may have SLA parameters that should also be satisfied, but the SD-WAN appliance may not have an indication of those SLA parameters.

Rather than assign every traffic flow associated with an unknown application to a default link designated for unknown application traffic, the techniques described herein may evaluate the data packets in the traffic flow in an effort to categorize the application into one or more of a plurality of classes. The SD-WAN appliance derives predicted SLA parameters for the unknown application based on the known SLA parameters from other, known applications that may also be categorized in that same class as the unknown application. Using these predicted SLA parameters, the SD-WAN appliance may find a link with QoE metrics that satisfy the predicted SLA parameters for the application and assign the traffic flow to the link that would satisfy the predicted requirements for the unknown application. The SD-WAN appliance may also store an indication of this prediction in a database such that it can be referenced upon future instances of receiving data from that application.

These techniques may also be extended within queues of the respective links. For instance, a singular WAN link may include multiple different queues. As each queue may have different QoE metrics, the SD-WAN appliance may extend the techniques described herein to determine a particular queue on the link that would be best suited to handle the particular traffic flow and the predicted SLA parameters for the traffic flow based on the QoE metrics for each of the queues. This additional level of granularity may increase the benefits of the techniques described herein.

There may be one or more advantages to using the techniques described herein. The techniques described herein provide QoE metrics for unknown applications. An SD-WAN appliance that implements the techniques described herein may map the unknown application to a known application class, depending on the traffic classification. The SD-WAN appliance that implements the techniques described herein may use any of packet level and flow level traffic classification techniques, including DPI, to identify the application or the class of the application. The SD-WAN appliance that implements the techniques described herein may auto-provision an SLA rule for the unknown application, as opposed to merely assigning all unknown traffic to a default link. The application classification engine may be updated with a new rule to associate this flow to the identified application/class. As such, the techniques described herein may provide a better experience for the end user and better resource utilization of the overall network.

In one example of the techniques described herein, a method is described, the method including, in response to receiving, by a network device, an application data packet of a data flow for an application, determining, by the network device, an application signature of the application data packet. The method also includes determining, by the network device, whether the application signature matches an entry in an application signature database. The method further includes, in response to determining that the application signature does not match any entry in the application signature database, identifying, by the network device and based on one or more characteristics of the application data packet, a class of the application. The method also includes assigning, by the network device and based on the class of the application and quality of experience (QoE) metrics for each of a plurality of links, the application data packet of the data flow to a first link of the plurality of links.

In another example of the techniques described herein, a network device is described. The network device includes a memory. The network device also includes one or more processors in communication with the memory. The one or more processors are configured to, in response to receiving an application data packet of a data flow for an application, determining, by the network device, an application signature of the application data packet. The one or more processors are also configured to determine whether the application signature matches an entry in an application signature database. The one or more processors are further configured to, in response to determining that the application signature does not match any entry in the application signature database, identify, based on one or more characteristics of the application data packet, a class of the application. The one or more processors are also configured to assign, based on the class of the application and quality of experience (QoE) metrics for each of a plurality of links, the application data packet of the data flow to a first link of the plurality of links.

In another example of the techniques described herein, a non-transitory computer-readable storage medium is described, the non-transitory computer-readable storage medium storing instructions thereon that when executed cause one or more processors, via execution of a software-defined networking (SDN) device, to, in response to receiving an application data packet of a data flow for an application, determine an application signature of the application data packet. The instructions, when executed, may also cause the one or more processors to determine whether the application signature matches an entry in an application signature database. The instructions, when executed, may further cause the one or more processors to, in response to determining that the application signature does not match any entry in the application signature database, identify, based on one or more characteristics of the application data packet, a class of the application. The instructions, when executed, may also cause the one or more processors to assign, based on the class of the application and quality of experience (QoE) metrics for each of a plurality of links, the application data packet of the data flow to a first link of the plurality of links.

The details of one or more examples are set forth in the accompanying drawings and the description below. Other features, objects, and advantages will be apparent from the description and drawings, and from the claims.

DETAILED DESCRIPTION

Figure 1:
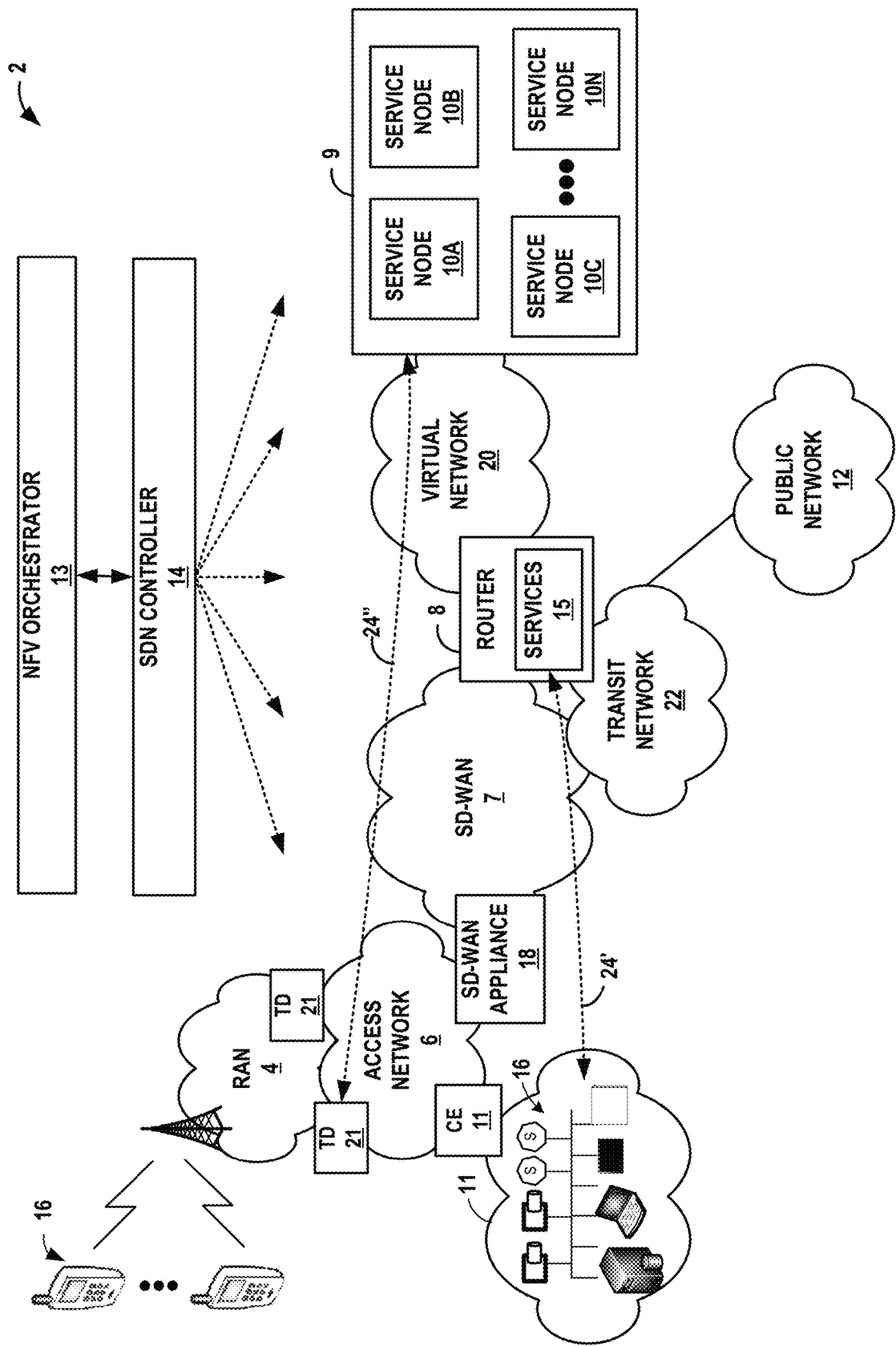
FIG. 1 is a block diagram illustrating an example software-defined wide area network system that assigns traffic originating from an unknown application to a link based on known application quality of experience metrics, in accordance with the techniques of this disclosure.

FIG. 1 is a block diagram illustrating an example software-defined wide area network system that assigns traffic originating from an unknown application to a link based on known application quality of experience metrics, in accordance with the techniques of this disclosure.

The example network system of FIG. 1 includes a SD-WAN system 2 that operates as a private network to provide packet-based network services to subscriber devices 16. That is, SD-WAN system 2 provides authentication and establishment of network access for subscriber devices 16 such that a subscriber device may begin exchanging data packets with public network 12, which may be an internal or external packet-based network such as the Internet.

In the example of FIG. 1, SD-WAN system 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or router 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of SD-WAN system 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

SD-WAN appliance 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access SD-WAN system 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, software-defined wide area network ("SD-WAN") appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 9. In addition, or alternatively, SD-WAN system 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN appliance 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, SD-WAN system 2 comprises a software defined network (SDN) and network functions virtualization (NFV) architecture. SDN controller device 14 may provide a high-level controller for configuring and managing the routing and switching infrastructure of SD-WAN system 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, elements within SD-WAN system 2, such as SD-WAN appliance 18, perform application data monitoring using various application quality of experience (QoE) metric functions, such as real-time performance monitoring (RPM) or two-way active measurement protocol (TWAMP), for example. That is, RPM and TWAMP may be used within SD-WAN system 2 to measure both one-way and two-way or round-trip metrics of network performance, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol and perform specific roles to start data sessions and exchange test packets for the data sessions. In the example network architecture illustrated in FIG. 1, SD-WAN appliance 18 is configured to perform the QoE metric predictions. SD-WAN appliance 18 allows for load sharing across connections and adjusts traffic flows based on network conditions to improve performance.

SD-WAN appliance 18, which performs the application classifications algorithms, also determine QoE metrics, such as service level agreement (SLA) metrics that include round-trip time (RTT), jitter, and packet loss, which were influenced by applications' real-time parameters like packet size, queues and burst of packets to determine the best path. However, different applications have different packet sizes in their data flows. If a traffic flow is received that is associated with an unknown application, and the flow is automatically assigned to a default link for unknown applications, that link may not provide an optimal environment for the transmission of that particular flow. If multiple traffic flows, each with unknown application associations, are received and all assigned to the same default link, despite having varying characteristics, the issues of a sub-optimal transmission environment may only be compounded. As described below with respect to FIGS. 2-4, the techniques described herein show how SD-WAN appliance 18 can implement a machine learning algorithm into determining an optimal link for a newly received traffic flow based on the behavior of assigning traffic flows for known applications.

QoE (Quality of Experience) aims to improve the user experience at the application level by constantly monitoring the class-of-service parameters and SLA compliance of application traffic, ensuring that the application data is sent over the most SLA-compliant link available. In many instances, an application is "known" to SD-WAN appliance 18, meaning that characteristics regarding the application, having been previously defined by the SD-WAN appliance, the client device, or the application developer themselves, are stored in a database by and/or available to the SD-WAN appliance. These known applications may have SLA parameters that are defined by the client device and/or application developers that should be satisfied whenever application traffic for that known application is received by the SD-WAN appliance. However, there is a growing number of new applications in the Internet, which may be unknown applications, or applications that do not have previously-defined SLA parameters or characteristics stored in a database and/or available to the SD-WAN appliance. These unknown applications may have SLA parameters that should also be satisfied, but the SD-WAN appliance may not have an indication of those SLA parameters. For these unknown, or "zero-day," applications, existing application classification engines may not have signatures stored in the database. The default SLA would be applied to the unknown applications, which may not give a good quality of experience to the end user. For instance, if the unknown application was an application for streaming video and the traffic was assigned to a link not suitable for video traffic, the assignment technique would lead to a degraded end user's experience.

In accordance with the techniques described herein, SD-WAN appliance 18 may implement techniques to predict the SLA metrics for a data flow based on a predicted class of the application from whence the data flow originated. SD-WAN appliance 18 may receive an application data packet of a data flow for an application. From this application data packet, SD-WAN appliance 18 may determine an application signature of the application data packet. SD-WAN appliance 18 may then determine whether the application signature matches an entry in an application signature database. If the application signature does match an entry in the application signature database, then SD-WAN appliance 18 may retrieve the SLA metrics, whether they were previously predicted or explicitly defined by the application, and find a link that has QoE metrics that satisfy the SLA metrics required for the application. Conversely, in response to determining that the application signature does not match any entry in the application signature database, SD-WAN appliance 18 may identify, based on one or more characteristics of the application data packet, a class of the application. Each class may be associated with a predicted set of SLA metrics, and rather than using explicitly defined SLA metrics provided by the application, SD-WAN appliance 18 may use the predicted set of SLA metrics in finding an optimal link to send the data flow to the intended destination. SD-WAN appliance 18 may then assign, based on the class of the application and QoE metrics for each of a plurality of links, the application data packet of the data flow to a first link of the plurality of links.

In some examples, the metrics carried by QoE probe packets may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements may include keepalive or path connectivity, round trip time (RTT), path delay, packet jitter, packet re-ordering, packet loss, service latency measurements, or service load measurements based on the received metrics.

The techniques described herein provide QoE metrics for unknown applications. SD-WAN appliance 18 may map the unknown application to a known application class, depending on the traffic classification. SD-WAN appliance 18 may use any of packet level and flow level traffic classification techniques, including DPI, to identify the application or the class of the application. SD-WAN appliance 18 may auto-provision the SLA rule for the unknown application, with different SLA rules potentially being provisioned for different application data flows, as opposed to merely assigning all unknown traffic to a default SLA rule and a default link. The application classification engine may be updated with a new rule to associate this flow to the identified application/class. As such, the techniques described herein may provide a better experience for the end user and better resource utilization of the overall network.

Figure 2:
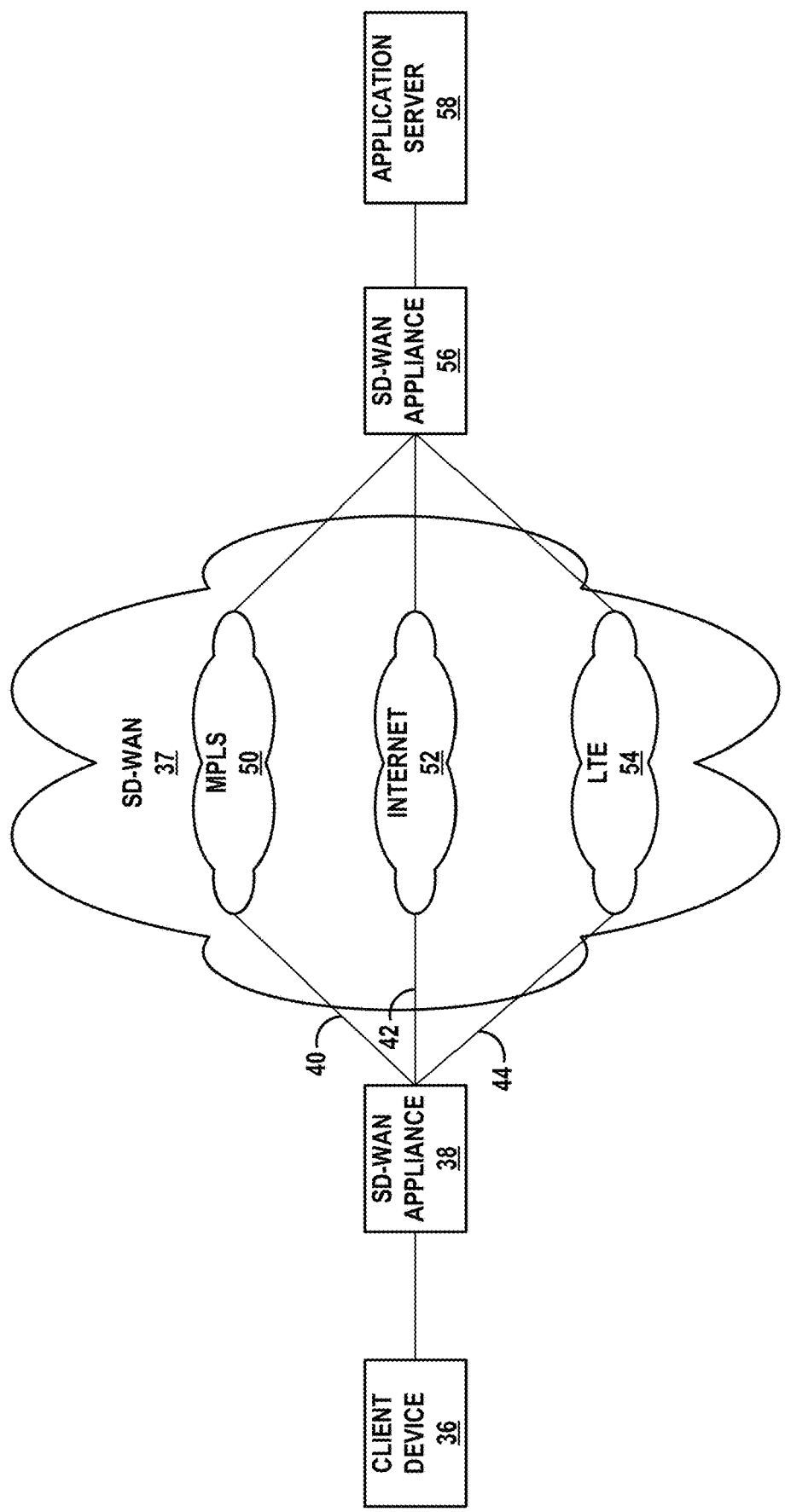
FIG. 2 is a block diagram illustrating an example software-defined wide area network, in accordance with one or more techniques of this disclosure.

FIG. 2 is a block diagram illustrating an example SD-WAN 37, in accordance with one or more techniques of this disclosure. In the example described herein, SD-WAN 37 includes three different WAN links: a first WAN link 40 coupling SD-WAN appliance 38 to a Multi-Protocol Layer Switching (MPLS) network 50, a second WAN link 42 coupling SD-WAN appliance 38 to Internet 52, and a third WAN link 44 coupling SD-WAN appliance 38 to long-term evolution (LTE) network 54. In other examples, SD-WAN 37 may include any number of links of any suitable type for transmitting data flows between the client side (e.g., client device 36 and SD-WAN appliance 38) and the application side (e.g., SD-WAN appliance 56 and application server 58).

The techniques described herein may include SD-WAN appliance 38 periodically sending probe packets of various sizes to each of the potential WAN links 40, 42, and 44 in order to keep up-to-date records of the metrics for WAN links 40, 42, and 44 such that the data flow may be routed swiftly upon receipt. For instance, when the techniques of this disclosure are enabled for SD-WAN appliance 38, SD-WAN appliance 38 may have a reference data store with indications of probe packets of various data packet sizes in data flows typically handled by SD-WAN appliance 38. These may be default sizes if a probing profile in the reference data store is not already specified or defined. Periodically, the network device may send multiple probe packets (e.g., one of each size specified in the reference data store) to each of the available WAN links 40, 42, and 44 in order to obtain current metrics for the specific WAN link if the WAN link was to transmit a data flow having the respective packet size, storing these metrics in the reference data store. As such, instead of reactively determining metrics for the various WAN links 40, 42, and 44 after analyzing the data flow, SD-WAN appliance 38 may proactively determine measurements for data flows routinely handled by SD-WAN appliance 38, enabling the data flows to be routed more quickly upon arrival at SD-WAN appliance 38 from client device 36.

In accordance with the techniques described herein, SD-WAN appliance 38 may receive an application data packet of a data flow for an application. For instance, client device 36 may begin executing an application locally. The execution of the application may include communicating with application server 58, and SD-WAN appliance 38 may be configured to forward the data flow from client device 36 to application server 58 via any of links 40, 42, and 44.

From this application data packet, SD-WAN appliance 38 may determine an application signature of the application data packet. SD-WAN appliance 38 may then determine whether the application signature matches an entry in an application signature database (not shown). If the application signature does match an entry in the application signature database, then SD-WAN appliance 38 may retrieve the SLA metrics, whether they were previously predicted or explicitly defined by the application, and find which of links 40, 42, and 44 has QoE metrics that satisfy the SLA metrics required for the application. For instance, SD-WAN appliance 38 may assign the data flow to internet link 42 upon determining the QoE metrics for internet link 42 would satisfy the SLA metrics required for the application executing on client device 36.

Conversely, in response to determining that the application signature does not match any entry in the application signature database, SD-WAN appliance 38 may identify, based on one or more characteristics of the application data packet, a class of the application. Each class may be associated with a predicted set of SLA metrics, and rather than using explicitly defined SLA metrics provided by the application, SD-WAN appliance 38 may use the predicted set of SLA metrics in finding an optimal link to send the data flow to the intended destination. SD-WAN appliance 38 may then assign, based on the class of the application and QoE metrics for each of a plurality of links, the application data packet of the data flow to a first link of the plurality of links. For instance, SD-WAN appliance 38 may determine that LTE link 44 has QoE metrics that can satisfy the predicted SLA metrics for the unknown application. After making this determination, SD-WAN appliance may assign the data flow to LTE link 44.

In some instances, SD-WAN appliance 38 may perform these techniques on a per-queue basis for multiple queues, or overlay paths, in each of WAN links 40, 42, and 44. For instance, LTE link 44 may include eight different queues or overlay links that are available to handle the data flow. Rather than generically determining to transmit the data flow on LTE link 44, SD-WAN appliance 38 may determine that a particular queue on LTE link 44 is optimally situated to satisfy the SLA metrics, predicted or explicit, of the application executing on client device 36. As such, SD-WAN appliance 38 may assign the data flow to that particular queue on LTE link 44. Throughout this disclosure, any technique performable on a per-link basis may also be performed on a per-queue basis within the respective link, including re-assigning data flows to other queues within the same link or re-assigning data flows from a queue in one link to a queue in a different link.

Figure 3:
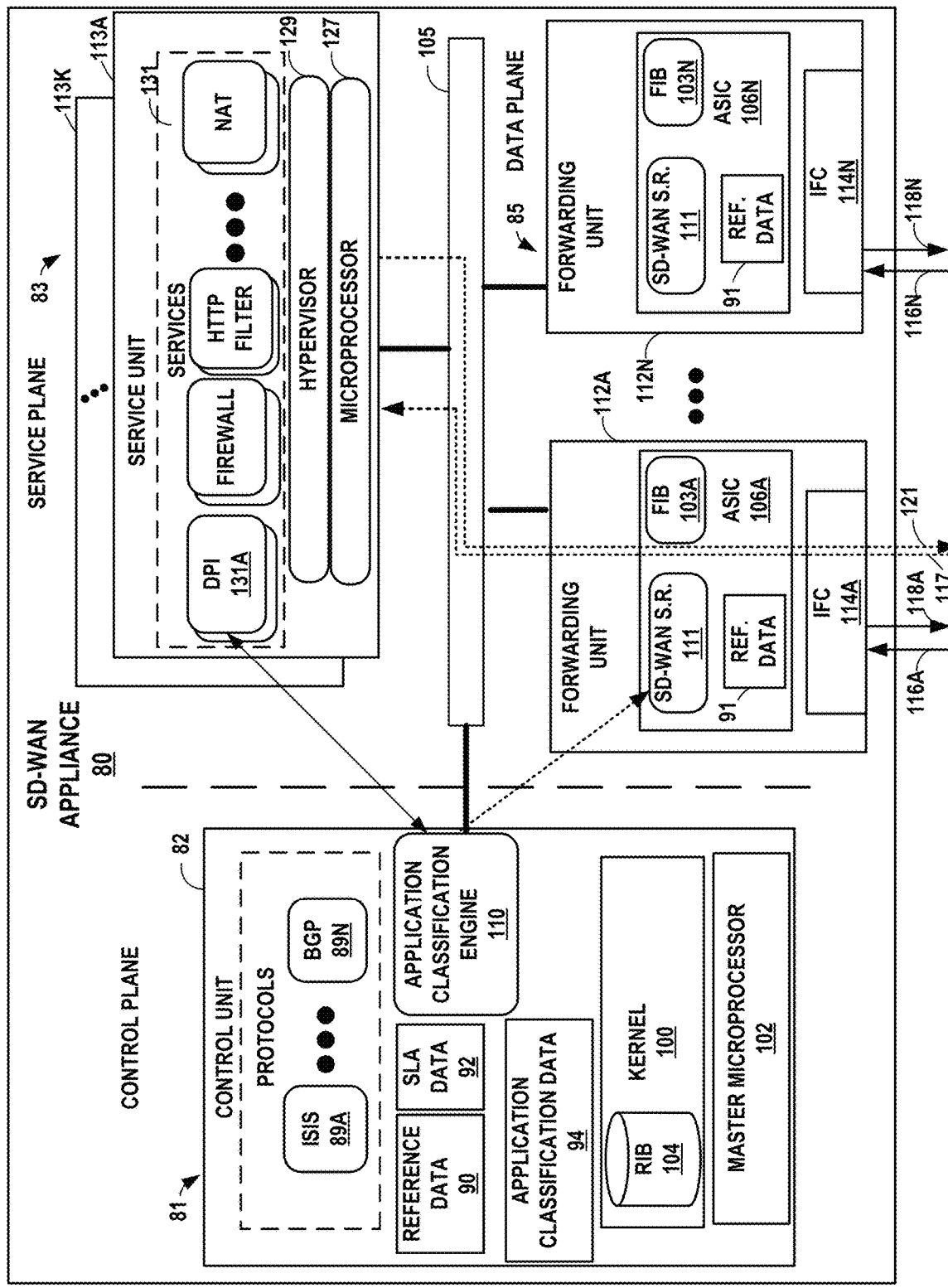
FIG. 3 is a block diagram illustrating an example software-defined wide area network appliance configured to execute one or more assignment functions for traffic originating from an unknown application to a link based on known application quality of experience metrics using an application classification engine, in accordance with the techniques of this disclosure.

FIG. 3 is a block diagram illustrating an example software-defined wide area network appliance 80 configured to execute one or more assignment functions for traffic originating from an unknown application to a link based on known application quality of experience metrics using an application classification engine 110, in accordance with the techniques of this disclosure. SD-WAN appliance 80 may be described herein within the context of SD-WAN system 2 of FIG. 1, and may represent any of routers 8 or SD-WAN appliance 18, for example. Moreover, while described with respect to a particular network device, e.g., a router or SD-WAN appliance, the techniques may be implemented by any network device that may operate as an SD-WAN appliance, such as a client device, a Layer 3 (L3) or L2/L3 switch, or server.

In this example, SD-WAN appliance 80 is divided into three logical or physical "planes" to include a control plane 81 that performs control operations for the device, a data plane 85 for forwarding transit network traffic and a service plane 83 for application of one or more network services 87 to transit packet flows that are forwarded by the router. That is, router 81 implements three separate functionalities (e.g., the routing/control, forwarding data and network service functionalities), either logically, e.g., as separate software instances executing on the same set of hardware components, or physically, e.g., as separate physical dedicated hardware components that either statically implement the functionality in hardware or dynamically execute software or a computer program to implement the functionality. In this example, a high-speed internal switch fabric 105 couples control plane 81, service plane 83, and data plane 85 to deliver data units and control messages among the units. Switch fabric 105 may represent an internal switch fabric or cross-bar, bus, or link.

In the example of FIG. 3, control plane 81 includes control unit 82 having master microprocessor(s) 102, which executes device management services, subscriber authentication and control plane routing functionality of SD-WAN appliance 80. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein. Executables, such as application classification engine 110 and services 131, may be operable by microprocessor 102 to perform various actions, operations, or functions of SD-WAN appliance 80. For example, microprocessor 102 of SD-WAN appliance 80 may retrieve and execute instructions stored by various data stores that cause microprocessor 102 to perform the operations of application classification engine 110 and services 131.

One or more storage components (e.g., RIB 104) within SD-WAN appliance 80 may store information for processing during operation of SD-WAN appliance 80 (e.g., SD-WAN appliance 80 may store data accessed by application classification engine 110 and services 131 during execution at SD-WAN appliance 80). In some examples, the storage component is a temporary memory, meaning that a primary purpose of the storage component is not long-term storage. Storage components on SD-WAN appliance 80 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components, in some examples, also include one or more computer-readable storage media. Storage components in some examples include one or more non-transitory computer-readable storage mediums. Storage components may be configured to store larger amounts of information than typically stored by volatile memory. Storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components may store program instructions and/or information (e.g., data) associated with application classification engine 110 and services 131. Storage components 248 may include a memory configured to store data or other information associated with application classification engine 110 and services 131.

Application engine 110 may be configured to perform the various techniques described herein. As shown herein, application engine 110 may be implemented as a component of control unit 82 in the control plane. However, in other implementations, application classification engine 110 may be a standalone component of a network device distinct and physically separate from SD-WAN appliance 80 and outside of any of the planes defined in SD-WAN appliance 80, assessing the received data traffic outside of the control plane, data plane, and service plane. In such instances, control unit 82 may replicate application packets as they are received, sending the original instances of the application traffic to one of forwarding units 112 and sending the replicated application traffic to application classification engine 110 to evaluate separately from the regular data flow.

In general, control unit 82 represents hardware or a combination of hardware and software of control that implements control plane protocols 89A-89N ("routing protocols 89") to learn and maintain routing information within routing information base 104 ("RIB 104"). RIB 104 may include information defining a topology of a network, such as service provider network of FIG. 1. Routing protocols 89 interact with kernel 100 (e.g., by way of API calls) executing on control unit 82 to update RIB 104 based on routing protocol messages received by SD-WAN appliance 80. Kernel 100 may resolve the topology defined by routing information in RIB 104 to select or determine one or more routes through the network. For example, the kernel may generate forwarding information in the form of forwarding information bases 103A-103N ("FIBs 103") based on the network topology represented in RIB 104, i.e., perform route resolution. Typically, kernel 100 generates FIBs 103 in the form of radix or other lookup trees to map packet information (e.g., header information having destination information and/or a label stack) to next hops and ultimately to interface ports of IFCs 114 associated with respective forwarding units 112. Each of FIBs 103 may associate, for example, network destinations with specific next hops and corresponding IFCs 114. For MPLS-related traffic forwarding, FIBs 103 stores, for a given FEC, label information that includes an incoming label, an outgoing label, and a next hop for a packet. Control unit 82 may then program forwarding units 112 of data plane 85 with FIBs 103, which installs the FIBs within lookup ASICs 106.

Data plane 85, in this example, is a decentralized data plane in that data plane functionality and packet forwarding functionality is distributed among a plurality of forwarding units 112A-112N ("forwarding units 112"). In the example of SD-WAN appliance 80, data plane 85 includes forwarding units 112 that provide high-speed forwarding of network traffic received by interface cards 114A-114N ("IFCs 44") via inbound links 116A-116N to outbound links 118A-118N. Forwarding units 112 may each comprise one or more packet forwarding engine ("PFE") coupled to respective interface cards 114 and may represent, for example, a dense port concentrator (DPC), modular port concentrator (MPC), flexible physical interface card (PIC) concentrator (FPC), or another line card, for example, that is insertable within a chassis or combination of chassis of SD-WAN appliance 80.

As shown in the example of FIG. 3, each of forwarding units 112 includes a respective one of lookup ASICs 106A-106N ("lookup ASICs 106") that receives control and data session traffic via IFC cards 114, performs route lookups and, based on routes installed to FIBs 103, forwards the traffic either to control unit 82 (control traffic destined for SD-WAN appliance 80) or to one of forwarding units 40 (transit data traffic) for output via an interface to one of output links 48. In one example, lookup ASICs 106 are microcode-controlled chipsets programmably configured by a slave microprocessor (not shown) executing on each of forwarding units 112. Specifically, in this example, each of ASICs 106 may be controllable by internal microcode programmed by a slave microprocessor.

When forwarding packets, control logic within each lookup ASICs 106 traverses the respective FIB 103 and, upon reaching a FIB entry for the packet (e.g., a leaf node), the microcode-implemented control logic automatically selects one or more forwarding next hops (FNHs) for forwarding the packet. In this way, ASICs 106 of forwarding units 112 process packets by performing a series of operations on each packet over respective internal packet forwarding paths as the packets traverse the internal architecture of SD-WAN appliance 80. Operations may be performed, for example, on each packet based on any of a corresponding ingress interface, an ingress PFE 114, an egress PFE 114, an egress interface or other components of SD-WAN appliance 80 to which the packet is directed prior to egress, such as one or more service cards. Forwarding units 112 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of forwarding units 112 arranges forwarding structures as next hop data that can be chained together as a series of "hops" along an internal packet forwarding path for the network device. In many instances, the forwarding structures perform lookup operations within internal memory of ASICs 106, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 106 determines the manner in which a packet is forwarded or otherwise processed by forwarding units 112 from its input interface on one of IFCs 114 to its output interface on one of IFCs 114.

Lookup ASICs 106 may be implemented using forwarding application specific integrated circuits (ASICs), field programmable gate arrays (FPGAs), or any other equivalent integrated or discrete logic circuitry, as well as any combinations of such components. Each of forwarding units 112 may include substantially similar components to perform substantially similar functionality.

Service plane 83 of SD-WAN appliance 80 includes a plurality of service units 113A-113K ("service units 13") that may be, as examples, removable service cards, which are configured to apply network services to packets flowing through data plane 85. That is, when forwarding packets, forwarding units 112 may steer packets to service plane 83 for application of one or more network services 131 by service units 113. In this example, each of service units 113 includes a microprocessor 127 configured to execute hypervisor 129 to provide an operating environment for a plurality of network services 131. As examples, service units 113 may apply firewall and security services, carrier grade network address translation (CG-NAT), media optimization (voice/video), IPSec/VPN services, deep packet inspection (DPI 131A), HTTP filtering, counting, accounting, charging, and load balancing of packet flows or other types of services applied to network traffic. Each of services 131 may be implemented, for example, as virtual machines or containers executed by hypervisor 129 and microprocessor 127.

In the example of FIG. 3, control unit 82 provides an operating environment for application classification engine 110. In some examples, control unit 82 may use application classification engine 110 to execute one or more TWAMP or RPM logical roles, such as a control client, a server, a sessions sender, and a session reflector.

In accordance with the techniques described herein, application classification engine 110 may receive an application data packet of a data flow for an application. Specifically, a packet is received at one of forwarding units 112, and the packet or a copy is sent up to the control plane for processing by application classification engine. From this application data packet, application classification engine 110 may determine an application signature of the application data packet. Application classification engine 110 may then determine whether the application signature matches an entry in an application signature database. If the application signature does match an entry in the application signature database, then application classification engine 110 may retrieve the SLA metrics, whether they were previously predicted or explicitly defined by the application, and find a link that has QoE metrics that satisfy the SLA metrics required for the application.

Conversely, in response to determining that the application signature does not match any entry in the application signature database, application classification engine 110 may identify, based on one or more characteristics of the application data packet, a class of the application. Examples of different classes of applications include a video class, an audio class, a business class, a gaming class, an educational class, a lifestyle class, a social media class, a utility class, an entertainment class, a productivity class, a news class, or a hybrid class consisting of a combination of two or more of any of the above classes of applications.

Each class may be associated with a unique predicted set of SLA metrics. For instance, known gaming applications may generally have a particular set of SLA metrics that must be satisfied. As such, application classification engine 110 may assign these generally known set of SLA parameters to the data flow if the data flow is determined to have characteristics similar to a gaming application.

In a hybrid class, the predicted set of SLA metrics may be determined in a number of ways. If one class in the hybrid class is more prevalent (i.e., has a higher amount of traffic associated with a first class as opposed to the second class of the hybrid class), the hybrid class may default to the more prevalent class in the combination. In other examples, application classification engine 110 may determine what percentage of the traffic is associated with each class in the hybrid combination, apply weights commensurate to the percentage of the traffic to the SLA metrics for each of the classes, and combine the weighted SLA metrics to develop a custom set of predicted SLA metrics for the particular combination of classes in the hybrid class. For instance, if a hybrid class is 70% news and 30% educational, these percentages may be used as weights in determining the custom SLA metrics for the hybrid class.

Rather than using explicitly defined SLA metrics provided by the application, application classification engine 110 may determine, based on the class of the application, a set of SLA metrics to be satisfied for the application as a predicted set of SLA metrics for the class. Application classification engine 110 may then determine that the QoE metrics of the first link of the plurality of links satisfy the SLA metrics for the determined class of the application.

In determining the class of the application, application classification engine 110 may determine the one or more characteristics of the application data packet. These characteristics can include information about a packet size, a header flag, an inter-arrival time between the application data packet and a second application data packet in the data flow, a traffic pattern, or a payload of the packets themselves. Application classification engine 110 may use any inspection technique available to ascertain this information, including deep packet inspection using DPI service 131A. Having stored characteristics of each of the potential classes, application classification engine 110 may determine that the one or more characteristics of the application data packet most closely match one or more characteristics of the first class of the plurality of classes.

Application classification engine 110 may employ various machine learning techniques in assigning a class to each of the data flows. Machine learning may refer to a set of mathematical modeling processes that allow a computer to learn without being explicitly programmed. For example, machine learning may include Monte Carlo simulation style experimentation. Machine learning for purposes of device modeling may require large amounts of operational data with a high amount of entropy (or, in other words, randomness) relative to other types of modeling algorithms. For accurate model creation, machine learning may employ real world data, but such real-world data is often difficult to collect due to privacy and other concerns. Furthermore, machine learning may require data from most if not all available parameter configurations.

For instance, application classification engine 110 may analyze various known applications to generate a model of those characteristics typically found in application traffic for a particular, known class. A large amount of data may be fed into application classification engine 110 to create the initial model, with a significant number of examples of application data packets for each class being analyzed by application classification engine 110. Upon determining the characteristics of the application data flow, application classification engine 110 may compare these characteristics to the various known combinations trained into application classification engine 110. Based on how the determined combination of characteristics compare to the reference combinations trained into application engine 110, application classification engine 110 may determine a probability that the data flow belongs to each class trained into application classification engine 110. Application classification engine 110 may select the class with the highest probability or score as the class for the application data flow, or may select any classes that satisfy a threshold as a combination of classes to make up a hybrid class for the application data flow.

Further, this machine learning may be unsupervised, meaning that application classification engine 110 may update the model used based on the classified application data flows without knowing the true outcome of the classification. Application classification engine 110 may consistently update the machine learning model based on known data, and also update the machine learning model based on the classifications without confirmation that the classifications are correct. This would provide more examples to include in the training for application classification engine 110.

In some instances, application classification engine 110 may store an indication of the application signature and the identified class of the application in the application classification database 94 such that this classification may be referenced in future when traffic is received from this application. However, this determination may not be static. Different applications can produce multiple different types of data flows. As such, this classification may provide an initial guidance, but the class of the application may be updated to be a hybrid class based on future traffic flows generated by the application. For instance, the first time the application is used, application classification engine 110 may determine that the data flow is associated with a video being requested by the application. As such, application classification engine 110 may classify the application in the video class. The next time the application is used, application classification engine 110 may determine that the data packets in the data flow are associated with an audio-only podcast being requested by the application. As such, application classification engine 110 may initially treat the second data flow as being a video based on the original classification, but then may dynamically update the entry in the database to show that the application is a hybrid audio-video class. This may lead to application classification engine 110 updating the predicted SLA metrics for this particular application.

Application classification engine 110 may then assign, based on the class of the application and QoE metrics for each of a plurality of links, the application data packet of the data flow to a first link of the plurality of links. However, the previously described updating of the predicted SLA metrics may lead to the assigned link no longer satisfying the SLA metrics for the hybrid class. In such examples, application classification engine 110 may send probe packets over one or more other links in the SD-WAN to find a link with QoE metrics that would satisfy the updated SLA metrics. Once application classification engine 110 finds a link that does satisfy the updated SLA metrics for the hybrid class, application classification engine 110 may reassign the data flow to the new link.

This link assigned the data flow is not a default link that receives all unknown traffic, by rather is dynamically selected and assigned on a per-data flow basis. For instance, in response to receiving a second application data packet of a second data flow for a second application different than the first application, application classification engine 110 may determine a second application signature of the second application data packet. Application classification engine 110 may then determine whether the second application signature matches an entry in the application signature database. In response to determining that the second application signature does not match any entry in the application signature database, application classification engine 110 may identify, based on one or more characteristics of the application data packet, a second class of the second application different than the first class of the first application. Application classification engine 110 may assign, based on the class of the application and the QoE metrics for each of a plurality of links, the application data packet of the data flow to a second link on the plurality of links different than the first link. In this way, the unknown application traffic received by application classification engine 110 is spread out amongst multiple links as opposed to putting all of this traffic on a default link.

The techniques described herein provide QoE metrics for unknown applications. SD-WAN appliance 38 may map the unknown application to a known application class, depending on the traffic classification. SD-WAN appliance 38 may use any of packet level and flow level traffic classification techniques, including DPI, to identify the application or the class of the application. SD-WAN appliance 38 may auto-provision the SLA rule for the unknown application, as opposed to merely assigning all unknown traffic to a default link. Application classification engine 110 may be updated with a new rule to associate this flow to the identified application/class. As such, the techniques described herein may provide a better experience for the end user and better resource utilization of the overall network.

Further, after identifying the characteristics of the application and assigning the application to a particular class, SD-WAN appliance 80 may perform additional operations on the data flow based on the determined class of the application. For instance, any of services 131 (e.g., firewall services, HTTP filter services, NAT services, etc.) may perform different function on different applications based on the various characteristics of the class. Services 131 may have access to information stored in the updated application classification database 94, such as by way of a separate database stored in the service plane that is also updated by application classification engine 110 in response to classifying a data flow. As such, once application classification engine 110 determines the class for the data flow, services 131 may perform various operations on the data flow that are dependent on the determined class. This may expand the benefits of the techniques described herein, enabling a more accurate and more granular application of services 131 to the various data flows processed by SD-WAN appliance 80.

Figure 4:
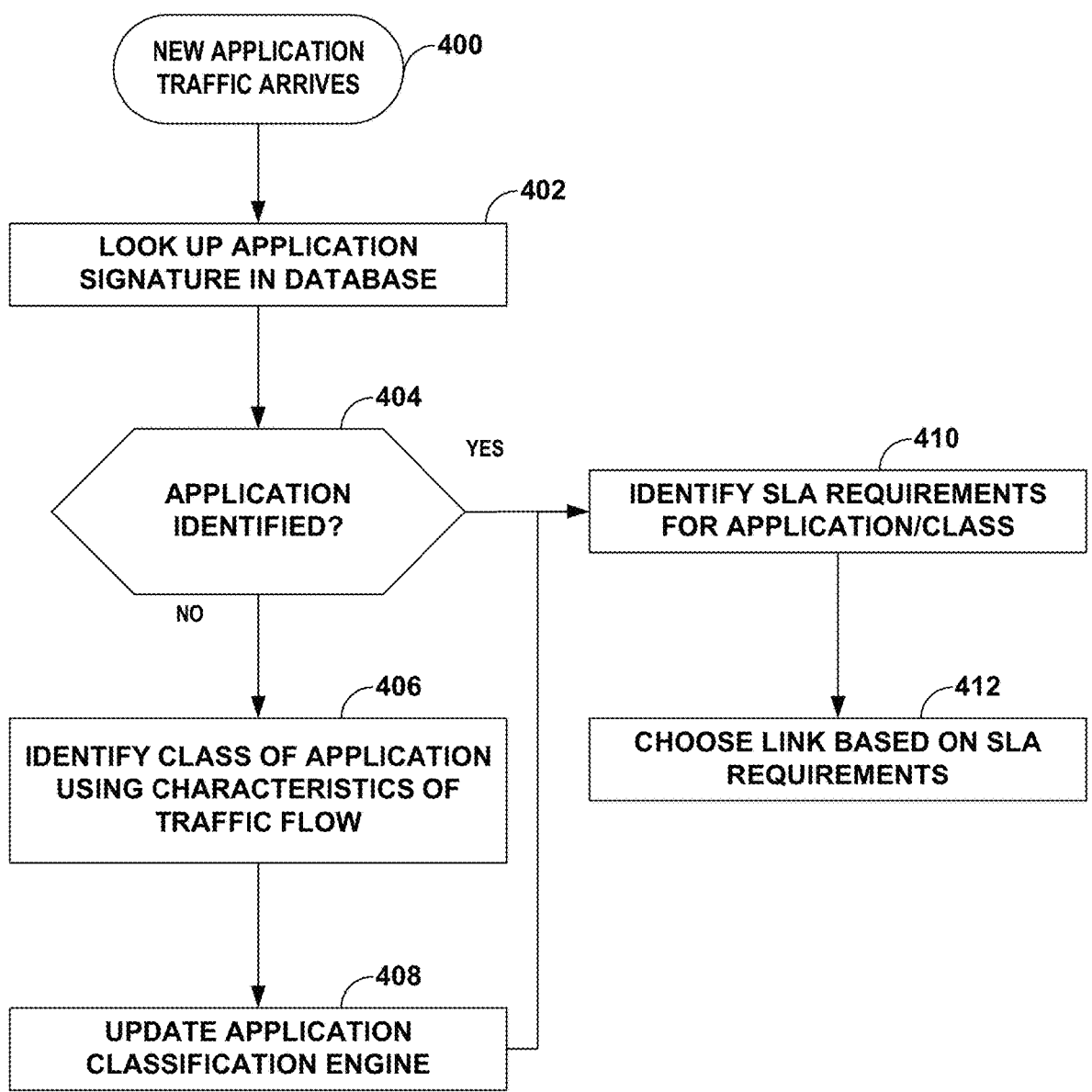
FIG. 4 is a flow diagram illustrating an example operation of assigning traffic originating from an unknown application to a link based on known application quality of experience metrics, in accordance with the techniques of this disclosure.

FIG. 4 is a flow diagram illustrating an example operation of assigning traffic originating from an unknown application to a link based on known application quality of experience metrics, in accordance with the techniques of this disclosure. These techniques may be described with respect to SD-WAN appliance 18 of FIG. 1.

In accordance with the techniques described herein, SD-WAN appliance 18 may receive application traffic (18). SD-WAN appliance 18 may then use DPI to determine an application signature of the application traffic and look up this signature in a database (402). If SD-WAN appliance 18 determines that the application associated with the application traffic is unknown ("NO" branch of 404), SD-WAN appliance 18 may further use the DPI to determine various characteristics of the application traffic to identify a class of the application (e.g., video, audio, business, gaming, etc.), or a combination of classes for the application (406). SD-WAN appliance 18 may update an application classification engine and/or a machine learning model with this combination of characteristics and the classification (408). After updating the application classification engine, or if the DPI enables SD-WAN appliance 18 to identify the application ("YES" branch of 404), SD-WAN appliance 18 may then identify potential SLA requirements for the overall class or combination of classes of the application traffic (410), and choose a link for the application traffic based on these SLA requirements (412).

Figure 5:
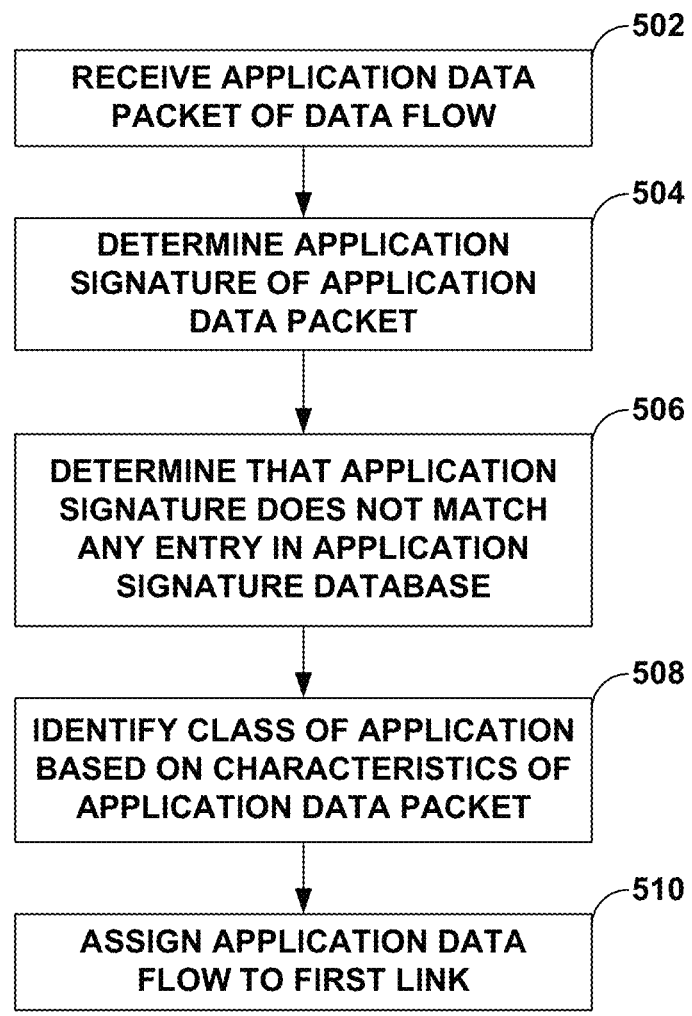
FIG. 5 is a flow diagram illustrating an example technique for a software-defined wide area network system that performs assignment functions for application traffic originating from an unknown application, in accordance with the techniques of this disclosure.

FIG. 5 is a flow diagram illustrating an example technique for a software-defined wide area network system that performs assignment functions for application traffic originating from an unknown application, in accordance with the techniques of this disclosure. The example operation may be performed by application classification engine 110 executed on SD-WAN appliance 18 from FIG. 1. The following are steps of the process, although other examples of the process performed in the techniques of this disclosure may include additional steps or may not include some of the below-listed steps.

In accordance with the techniques described herein, application classification engine 110 may receive an application data packet of a data flow for an application (502). From this application data packet, application classification engine 110 may determine an application signature of the application data packet (504). Application classification engine 110 may then determine that the application signature does not match any entry in an application signature database (506). In response to determining that the application signature does not match any entry in the application signature database, application classification engine 110 may identify, based on one or more characteristics of the application data packet, a class of the application (508). Each class may be associated with a predicted set of SLA metrics, and rather than using explicitly defined SLA metrics provided by the application, application classification engine 110 may use the predicted set of SLA metrics in finding an optimal link to send the data flow to the intended destination. Application classification engine 110 may then assign, based on the class of the application and QoE metrics for each of a plurality of links, the application data packet of the data flow to a first link of the plurality of links (510).

The techniques described herein provide QoE metrics for unknown applications. SD-WAN appliance 18 may map the unknown application to a known application class, depending on the traffic classification. SD-WAN appliance 18 may use any of packet level and flow level traffic classification techniques, including DPI, to identify the application or the class of the application. SD-WAN appliance 18 may automatically provision the SLA rule for the unknown application, as opposed to merely assigning all unknown traffic to a default link. The application classification engine may be updated with a new rule to associate this flow to the identified application/class. As such, the techniques described herein may provide a better experience for the end user and better resource utilization of the overall network.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

The invention claimed is:

1. A method comprising:
  in response to receiving, by a network device, an application data packet of a new data flow for an application, determining, by the network device, an application signature of the application data packet;
  determining, by the network device, that the application signature does not match any entry in an application signature database, wherein the application signature database is used to identify Service Level Agreement (SLA) parameters for applications;
  in response to determining that the application signature does not match any entry in the application signature database, selecting, by the network device and based on one or more characteristics of the application data packet, a class of application, from among a plurality of classes, with which to categorize the new data flow;
  predicting, based on the selected class of application, SLA parameters that should be applied to the new data flow, wherein different classes of the plurality of classes are associated with different SLA parameters;
  updating the application signature database based on the selected class of application; and
  assigning, by the network device and based on the predicted SLA parameters and quality of experience (QoE) metrics of each of a plurality of links, the application data packet of the new data flow to a first link of the plurality of links.

2. The method of claim 1, further comprising:
  determining, by the network device, that the QoE metrics of the first link of the plurality of links satisfy the SLA parameters for the class of the application,
  wherein assigning the application data packet of the new data flow to the first link comprises selecting the first link to which to assign the application data packet of the new data flow based on determining the QoE metrics of the first link satisfy the SLA parameters for the class.

3. The method of claim 1, wherein updating the application signature database comprises:
  storing, by the network device and in the application signature database, an indication of the application signature and the selected class of the application for use in classifying subsequent new data flows.

4. The method of claim 1, wherein the selected class is a first selected class, and wherein selecting the class of application comprises:
  determining, by the network device, the one or more characteristics of the application data packet; and
  determining, by the network device, and using an application classification engine, that the one or more characteristics of the application data packet most closely match one or more characteristics of the first class of the plurality of classes.

5. The method of claim 4, wherein determining the one or more characteristics of the application data packet comprises:
performing, by the network device, deep packet inspection on the application data packet to determine the one or more characteristics of the application data packet.

6. The method of claim 1, wherein the plurality of classes comprises two or more of a video class, an audio class, a business class, a gaming class, an educational class, a lifestyle class, a social media class, a utility class, an entertainment class, a productivity class, a news class, or a hybrid class,
wherein the one or more characteristics of the application data packet comprise one or more of a packet size, a header flag, a traffic pattern, and an inter-arrival time between the application data packet and a second application data packet in the new data flow.

7. The method of claim 1, further comprising:
applying, by the network device and based on the selected class, one or more services to the new data flow for the application.

8. The method of claim 1, wherein the selected class is a first class, wherein the application data packet is a first application data packet, wherein the new data flow is a first new data flow, wherein the application is a first application, the method further comprising:
in response to receiving, by the network device, a second application data packet of a second new data flow for a second application different than the first application, determining, by the network device, a second application signature of the second application data packet;
determining, by the network device, that the second application signature does not match any entry in the application signature database;
in response to determining that the second application signature does not match any entry in the application signature database, selecting, by the network device and based on one or more characteristics of the second application data packet, a second class of the second application from among the plurality of classes, the second class different than the first class of the first application; and
predicting, based on the selected second class, SLA parameters that should be applied to the second new data flow, wherein the SLA parameters that should be applied to the second new data flow are different than the predicted SLA parameters that should be applied to the first new data flow;
assigning, by the network device and based on the predicted SLA parameters that should be applied to the second new data flow and the QoE metrics for each of the plurality of links, the application data packet of the second new data flow to a second link on the plurality of links different than the first link.

9. The method of claim 1, further comprising:
sending, by the network device, one or more probe packets on each of the plurality of links to determine the respective QoE metrics for each of the plurality of links.

10. The method of claim 1, wherein selecting the class of application comprises:
determining, by the network device, that the new data flow of the application includes a first percentage of data packets belonging to a first class and a second percentage of data packets belonging to a second class; and
determining, by the network device, the class to be one of:
the first class when the first percentage is greater than the second percentage,
the second class when the second percentage is greater than the first percentage, or
a combination of the first class and the second class in proportion to the first percentage and the second percentage.

11. A network device comprising:
a memory; and
one or more processors in communication with the memory, the one or more processors configured to:
in response to receiving an application data packet of a new data flow for an application, determine an application signature of the application data packet;
determine that the application signature does not match any entry in an application signature database, wherein the application signature database is used to identify Service Level Agreement (SLA) parameters for applications;
in response to determining that the application signature does not match any entry in the application signature database, select, based on one or more characteristics of the application data packet, a class of the application, from among a plurality of classes, with which to categorize the new data flow;
predict, based on the selected class of application, SLA parameters that should be applied to the new data flow, wherein different classes of the plurality of classes are associated with different SLA parameters;
update the application signature database based on the selected class of application; and
assign, based on the predicted SLA parameters and quality of experience (QoE) metrics of each of a plurality of links, the application data packet of the new data flow to a first link of the plurality of links.

12. The network device of claim 11, wherein the one or more processors are further configured to:
determine that the QoE metrics of the first link of the plurality of links satisfy the SLA parameters for the class of the application,
wherein the one or more processors being configured to assign the application data packet of the new data flow to the first link comprises the one or more processors being configured to select the first link to which to assign the application data packet of the new data flow based on determining the QoE metrics of the first link satisfy the SLA parameters for the class.

13. The network device of claim 11, wherein the one or more processors being configured to update the application signature database comprises the one or more processors being configured to:
store, in the application signature database, an indication of the application signature and the selected class of the application.

14. The network device of claim 11, wherein the selected class is a first selected class, and wherein the one or more processors being configured to select the class of application comprises the one or more processors being configured to:
determine the one or more characteristics of the application data packet; and
determine, using an application classification engine, that the one or more characteristics of the application data packet most closely match one or more characteristics of the first class of the plurality of classes.

15. The network device of claim 11, wherein the plurality of classes comprises two or more of a video class, an audio class, a business class, a gaming class, an educational class, a lifestyle class, a social media class, a utility class, an entertainment class, a productivity class, a news class, or a hybrid class.

16. The network device of claim 11, wherein the device comprises a software-defined networking (SDN) device.

17. A non-transitory computer-readable storage medium storing instructions thereon that when executed cause one or more processors, via execution of a software-defined networking (SDN) device, to:
   in response to receiving an application data packet of a new data flow for an application, determine an application signature of the application data packet;
   determine that the application signature does not match any entry in an application signature database, wherein the application signature database is used to identify Service Level Agreement (SLA) parameters for applications;
   in response to determining that the application signature does not match any entry in the application signature database, select, based on one or more characteristics of the application data packet, a class of the application, from among a plurality of classes, with which to categorize the new data flow;
   predict, based on the selected class of application, SLA parameters that should be applied to the new data flow, wherein different classes of the plurality of classes are associated with different SLA parameters;
   update the application signature database based on the selected class of application; and
   assign, based on the predicted SLA parameters and quality of experience (QoE) metrics of each of a plurality of links, the application data packet of the new data flow to a first link of the plurality of links.

18. The non-transitory computer-readable storage medium of claim 17, wherein the instructions, when executed, further cause the one or more processors to:
   determine that the QoE metrics of the first link of the plurality of links satisfy the SLA parameters for the class of the application,
   wherein the instructions that cause the one or more processors to assign the application data packet of the new data flow to the first link comprise instructions that, when executed, cause the one or more processors to select the first link to which to assign the application data packet of the new data flow based on determining the QoE metrics of the first link satisfy the SLA parameters for the class.

19. The non-transitory computer-readable storage medium of claim 17, wherein the instructions to update the application signature database comprise instructions that, when executed, further cause the one or more processors to:
   store, in the application signature database, an indication of the application signature and the selected class of the application.

20. The non-transitory computer-readable storage medium of claim 17, wherein the selected class is a first selected class,
   wherein the plurality of classes comprises two or more of a video class, an audio class, a business class, a gaming class, an educational class, a lifestyle class, a social media class, a utility class, an entertainment class, a productivity class, a news class, or a hybrid class, and
   wherein the instructions that cause the one or more processors to select the first class of the application comprise instructions that, when executed, cause the one or more processors to:
   determine the one or more characteristics of the application data packet; and
   determine, using an application classification engine, that the one or more characteristics of the application data packet most closely match one or more characteristics of the first class of the plurality of classes.

* * * * *